(12) United States Patent
Beard et al.

(10) Patent No.: US 11,392,700 B1
(45) Date of Patent: Jul. 19, 2022

(54) SYSTEM AND METHOD FOR SUPPORTING CROSS-PLATFORM DATA VERIFICATION

(71) Applicant: FireEye, Inc., Milpitas, CA (US)

(72) Inventors: Robert Beard, Charlotte, NC (US); Robin Caron, Charlotte, NC (US)

(73) Assignee: FireEye Security Holdings US LLC, Milpitas, CA (US)

( * ) Notice: Subject to any disclaimer, the term of this patent is extended or adjusted under 35 U.S.C. 154(b) by 260 days.

(21) Appl. No.: 16/457,573

(22) Filed: Jun. 28, 2019

(51) Int. Cl.
*G06F 21/57* (2013.01)
*G06F 21/56* (2013.01)
*G06F 16/23* (2019.01)

(52) U.S. Cl.
CPC .......... *G06F 21/57* (2013.01); *G06F 16/2365* (2019.01); *G06F 21/565* (2013.01); *G06F 2221/033* (2013.01)

(58) Field of Classification Search
CPC .. G06F 21/57; G06F 21/565; G06F 2221/033; G06F 16/2365
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

(Continued)

*Primary Examiner* — Ashokkumar B Patel
*Assistant Examiner* — William B Jones
(74) *Attorney, Agent, or Firm* — Rutan & Tucker, LLP (57) ABSTRACT

A trust verification system for automatically verify an integrity of an object across multiple operating system (OS) platforms. The trust verification system features package verification logic, catalog verification logic, and component verification logic. The package verification logic recovers, from an incoming package, (i) an object, (ii) a catalog including identifiers associated with software component(s) forming the object and representation(s) associated with each of the software component(s), and (iii) a representation of the catalog. The catalog verification logic is configured to verify an integrity of the catalog while the component verification logic is configured to verify an integrity of software component(s) associated with the object. Thereafter, the package verification logic verifies an integrity of the object associated with the incoming package in response to the catalog verification logic verifying the integrity of the catalog and the component verification logic verifying the integrity of the software component(s).

21 Claims, 6 Drawing Sheets

(56) References Cited

U.S. PATENT DOCUMENTS

| | | |
|---|---|---|
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |

(56) References Cited

U.S. PATENT DOCUMENTS

| | | |
|---|---|---|
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,270,467 B1 * | 2/2016 | Chen ............... G06F 21/57 |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |

(56) References Cited

U.S. PATENT DOCUMENTS

| | | |
|---|---|---|
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |

(56) References Cited

U.S. PATENT DOCUMENTS

| | | |
|---|---|---|
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |

(56) References Cited

U.S. PATENT DOCUMENTS

| | | |
|---|---|---|
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0092700 A1* | 3/2016 | Smith .................. G06F 21/566 726/1 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0350529 A1* | 12/2016 | Kerr ....................... G06F 21/51 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEExplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

(56) References Cited

OTHER PUBLICATIONS

Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR SUPPORTING CROSS-PLATFORM DATA VERIFICATION

FIELD

Embodiments of the disclosure relate to data integrity verification. More particularly, embodiments of the disclosure relate to a system and method directed toward verifying the integrity of data across multiple platforms.

GENERAL BACKGROUND

Over the last decade, network devices that access the Internet or other publicly accessible networks have been increasingly targeted for malicious attack. These malicious attacks may involve tampering with or substitution of information prior to installation onto an endpoint device associated with a targeted victim. This information may be an executable (e.g., instructions operating as software code in the form of a plug-in, an application, a program, a script, etc.) which, when downloaded and upon execution, perpetuates a cybersecurity attack (hereinafter, "cyberattack"). In these situations, the victim may be unaware that the executable has been tampered with during or after download, but prior to installation and launching within the network device.

Various processes and devices have been employed by network devices to combat cyberattacks and other security threats. As an illustrative example, daemon software operating in the background of an endpoint device, referred to as a "cybersecurity agent," has been installed on a network device to conduct certain operations to detect cyberattacks. These operations may include, but are not limited or restricted to, conducting a signature-based analysis on newly received information, such as a plug-in for subsequent storage or installation on the endpoint device for example, for comparison with signatures associated with previously uncovered malicious plug-ins associated with a cyberattack. The operations are designed to detect and/or prevent attempted cyberattacks against the endpoint device.

Currently, cybersecurity agents may be configured to launch subordinate processes (e.g., plug-ins) to further the capabilities of these cybersecurity agents. As an example, plug-ins may be created to augment the functionality of a cybersecurity agent through an additional set of new features (capabilities). Given that plug-ins (e.g., extensions or other code adding further functionality of another software component) have been determined to be part of a cybersecurity threat vector, it is critical to ensure that the integrity of the plug-ins is preserved (i.e., the plug-ins are "legitimate").

In the past, many cybersecurity vendors ensured the legitimacy of their software by building monolithic executables, such as monolithic cybersecurity agents for example, and conducting a hash operation on each of the cybersecurity agents to generate a corresponding hash value for users to verify agent authenticity. However, given an evolving threat landscape, continuous updating and reverification of a cybersecurity agent is needed, thereby imposing significant delays in providing needed updates to combat an ever-changing threat landscape.

With modular plug-in architectures, a mechanism to determine the legitimacy of a plug-in (e.g., confirming the integrity of the plug-in has been retained during installation), has been challenging to implement across many different operating system (OS) platforms. Often the applications and their plug-ins will be updated on different schedules. Also, each type of OS platform may rely on its own specific (and distinct) mechanism to confirm the integrity of plug-ins before installation, thereby failing to take advantage of efficiencies that would be realized with a trust verification system that supports multiple platforms (i.e., cross-platform).

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

To verify the integrity of software installed within a network device, such as plug-ins to be launched by an application or cybersecurity agent for example, a trust verification system has been implemented to verify the integrity of such software. The verification of the integrity of software components forming an object (e.g., plug-in) may be conducted on and across multiple operating system (OS) platforms. This cross-platform software architecture reduces the scale of software development required in analyze the integrity of one or more software components operability as or as part of a cybersecurity agent. Stated differently, changes in operability of the cybersecurity agent does not have to be conducted for each version of the cybersecurity agent that is coded to support a particular OS platform (i.e., software development is more efficient).

Herein, the trust verification system is configured to conduct a "dual-stage" verification on information (e.g., software such as plug-ins) submitted for verification in order to confirm that the integrity of such software has been preserved. According to one embodiment of the disclosure, the trust verification system includes verification logic, which may include package verification logic, catalog verification logic and/or component verification logic. The verification logic may operate as a component of a host application (e.g., cybersecurity agent) or some or all of the verification logic may operate separately from the host application. While operations of the trust verification system are discussed in connection with a specific deployment, namely a deployment including a cybersecurity agent and its plug-in architecture for example, the inventive aspects are not limited to this specific deployment.

As described below in greater detail, the trust verification system receives a message, including a "package," to be verified and stored (for later use). Herein, according to one embodiment of the disclosure, a "package" includes (i) software whose integrity is to be verified (e.g., new or updated plug-in, etc.), (ii) a catalog that generally corresponds to information to verify the integrity of components forming the software (e.g., a collection of software components (or identifiers each associated with a particular software component) that form at least a portion of the software and/or a corresponding representation for that particular software component), and (iii) a representation of the catalog (e.g., a value resulting from conversion of content forming the catalog such as a hash value of the catalog, a checksum, a concatenated value, etc.). For instance, where the software is a new or updated plug-in for example, the "catalog" may include an identifier for each plug-in component forming a specific portion of the new (or updated) plug-in along with its corresponding representation (e.g., hash value for each corresponding plug-in component). According to one embodiment, each plug-in component identifier is associated with a new or updated plug in and the representation for the plug-in (e.g., hash value, checksum, concatenation, etc.). According to another embodiment of the disclosure, the catalog may simply include an identifier of the plug-in along with its representation (e.g., hash value) for the plug-in.

More specifically, according to one embodiment of the disclosure, the package verification logic is configured to receive and parse an incoming package in order to separate the plug-in under analysis, the catalog and a hash value of the catalog (representation). During runtime, if a plug-in is to be initialized and launched by the cybersecurity agent, the catalog verification logic accesses and analyzes the catalog by at least conducting a hash operation on the catalog to produce a hash value (hereinafter, "generated catalog hash value") and authenticating the catalog using the hash value of the catalog provided in the package (hereinafter, "packaged catalog hash value"). Based on a successful comparison between the generated catalog hash value and the packaged catalog hash value, the integrity of the catalog has been confirmed. Otherwise, the catalog verification, and hence the verification of the plug-in itself, has failed.

Thereafter, the integrity of the plug-in (or even separate plug-in software components of the plug-in) may be similarly verified. In particular, for each software component of the plug-in, the component verification logic analyzes that plug-in component by at least conducting a hash operation on the plug-in component to produce a corresponding hash value (hereinafter, "generated component hash value") and authenticating the plug-in component using the hash value of the plug-in component included as part of the catalog (hereinafter, "cataloged component hash value"). Based on a successful comparison between the generated component hash value and the cataloged component hash value, the integrity of the plug-in component may be confirmed. This is an iterative process in which the integrity of the entire plug-in (all plug-in components) or a portion of the plug-in (certain specific plug-in components in which other components are trusted) is verified.

In the event that the integrity of all of the software plug-in components have been verified, the plug-in may be initialized and/or launched. This dual-stage verification process is platform-agnostic to ensure that the same hash value can be used across all operating system (OS) platforms of interest.

Herein, according to one embodiment of the disclosure, the trust verification system operates on a network device that is responsible for executing the cybersecurity agent (i.e., host application) and cybersecurity plug-ins, where the network device may be an endpoint device. By so operating, the trust verification system may enable rapid development of trusted plug-ins for a plurality of environments.

I. Terminology

In the following description, certain terminology is used to describe various features of the invention. For example, the terms "logic" and "component" are representative of hardware, firmware or software that is configured to perform one or more functions. As hardware, logic (or component) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

Logic (or component) may be software such as compiled, executable code or may include one or more subroutines, scripts, applets, servlets or routines, source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "network device" should be generally construed as physical logic (electronics) or virtualized logic with data processing capability and/or a capability of connecting to any type of network, such as a public network (e.g., Internet), a private network (e.g., any type of local area network), a public cloud network (e.g., Amazon Web Service (AWS®), Microsoft Azure®, Google Cloud®, etc.), or a private cloud network. Examples of a network device may include, but are not limited or restricted to, any of the following: a server; a mainframe; a firewall; a data transfer device (e.g., intermediary communication device, router, repeater, portable mobile hotspot, etc.); an endpoint device (e.g., a laptop, a smartphone, a tablet, a desktop computer, a netbook, gaming console, etc.); or a virtual device being software that supports data capture, preliminary analysis of meta-information associated with cybersecurity intelligence.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "interconnect" may be construed as a physical or logical communication path between two or more network devices or between different logic (or components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include an inter-process communication (IPC) mechanism that allows for the exchange of content between different logic.

The term "computerized" generally represents that any corresponding operations are conducted by hardware in combination with software or firmware.

The term "plug-in" may be broadly construed as software that adds a specific capability or capabilities to another computer program, which is intended to include add-ins, add-ons, or extensions as well. In other words, the operation of particular software can be altered or customized by establishing communicative couplings between the particular software and one or more plug-ins. Various types of plug-ins, for example, are available for use in popular web browsers to add features such as search-engines, virus scanners, or the ability to open a previously unsupported file type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General System Architecture

Figure 1:
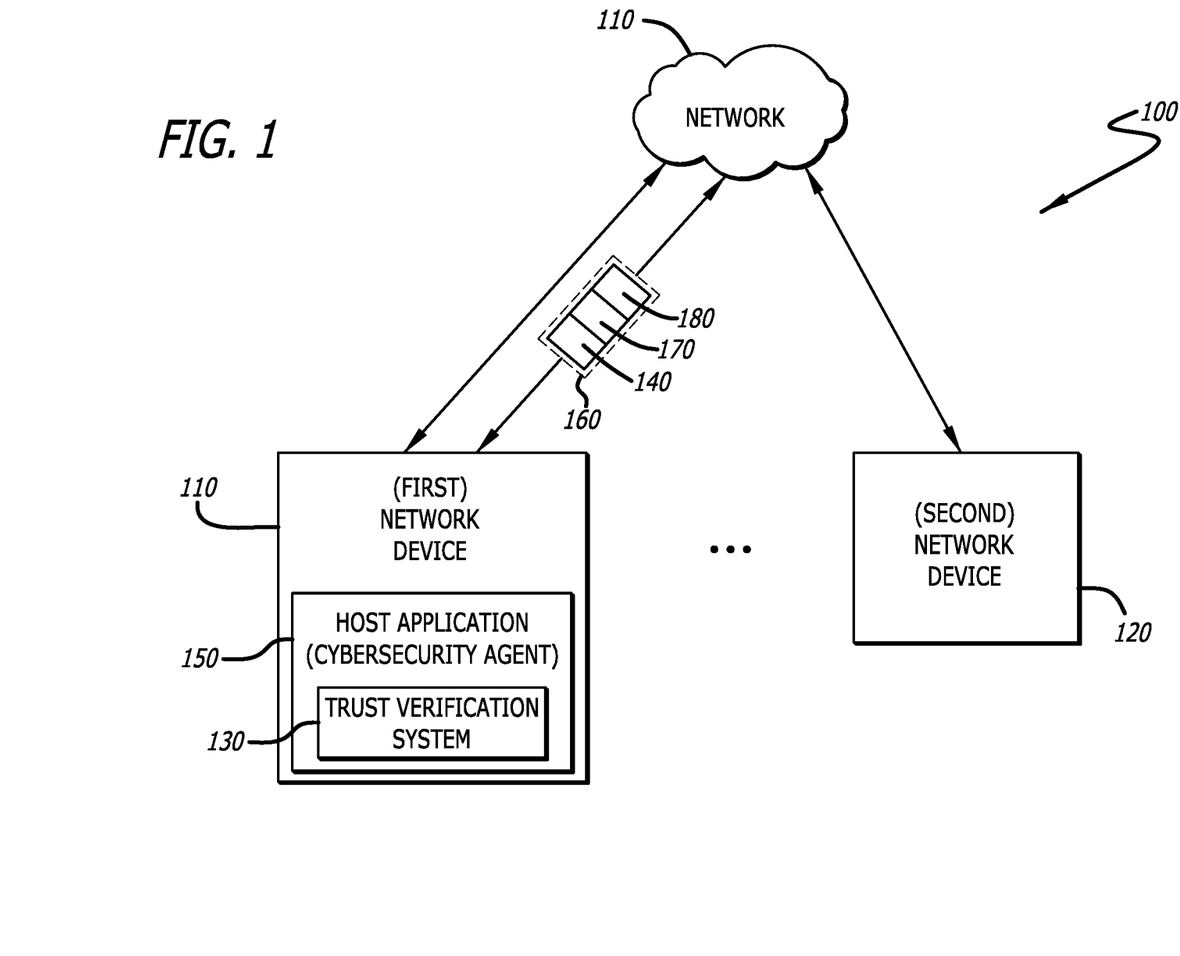
FIG. 1 is an exemplary block diagram of a communication system including a network device deploying a cross-platform trust verification system to analyze the integrity of software before installation and/or launch.

Referring to FIG. 1, an exemplary block diagram of a communication system 100 including a first network device 110 and a second network device 120 is shown. Herein, the first network device 110 includes a cross-platform trust verification system 130, which is configured to analyze the integrity of an object 140 before installation and/or launch. As shown, the trust verification system 130 may be deployed as logic within the first network device 110, such as logic implemented as part of a host application 150 running as an application in the foreground or background (e.g., daemon application). Alternatively, it is contemplated that the trust verification system 130 may be deployed separate from the host application 150.

As shown in FIG. 1, the trust verification system 130 receives the object 140, which may be software to extend the functionality or usability of the host application 150. As an illustrative example, the object 140 may correspond a new or updated plug-in, namely software that extends the functionality or usability of the host application 150. For instance, the plug-in may be software configured to interact with the host application. Alternatively, the plug-in may be software configured to function on the host application 150 (i.e., similar to an "add-on") in lieu of interacting with the host application 150.

Herein, the object 140 may be encapsulated into and as part of a package 160. The package 160 may include (i) the object 140 whose integrity is to be verified (e.g., plug-in 140), (ii) a catalog 170, and (iii) a representation 180 of the catalog 170. The representation 180 may include information having a prescribed length (e.g., bitwise, bytewise, etc.) resulting from conversion of content within the catalog 170. Examples of the representation may include a hash value (e.g., $2^x$-bit hash value, where $x \geq 7$), although other type of representations may be used (e.g., checksum, concatenation of content within the catalog 170, etc.). Where the object 140 is a new or updated plug-in for example, the catalog 170 includes at least one or more plug-in component identifiers and their associated representations (e.g., hash values for the plug-in components), as described below.

Figure 2:
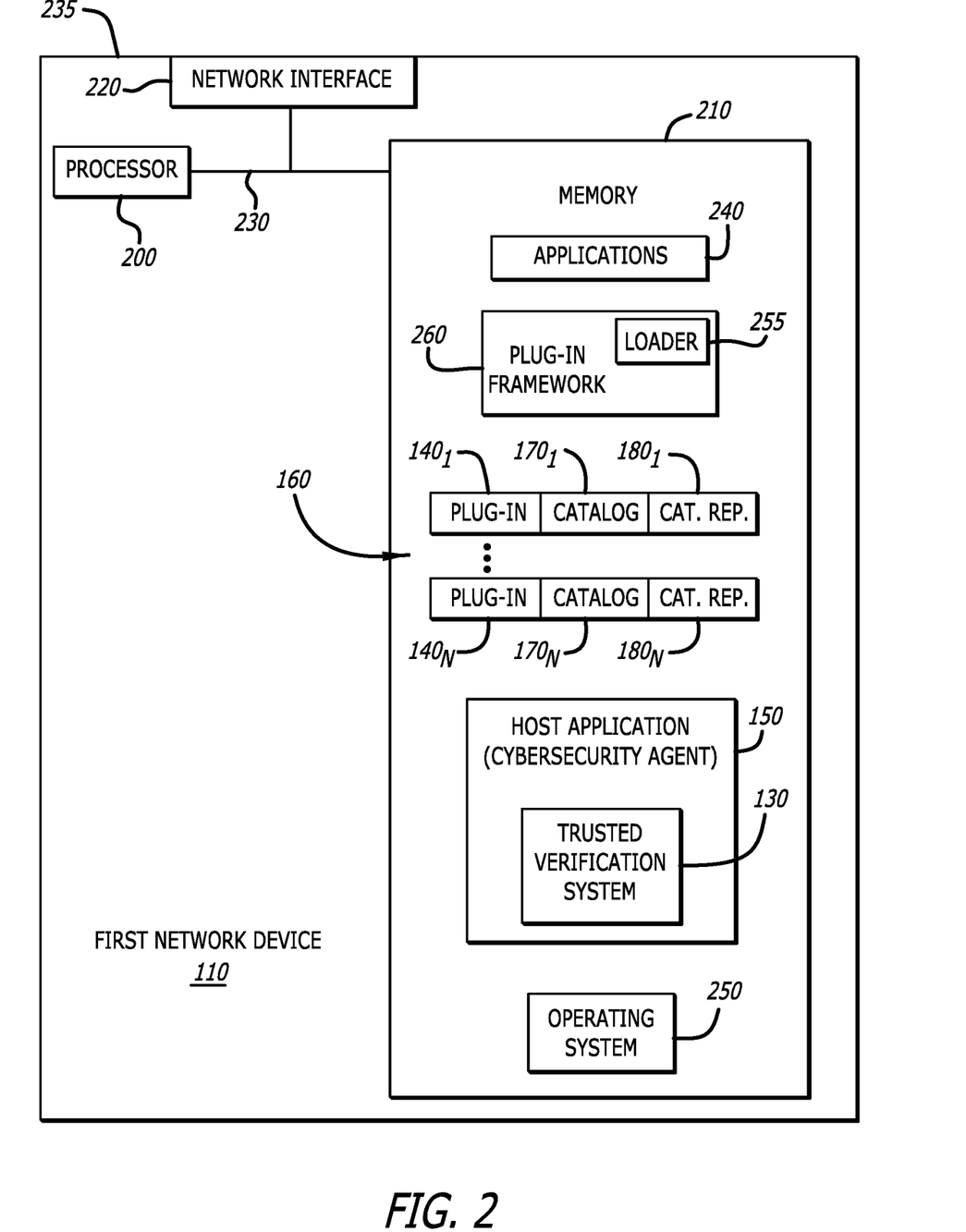
FIG. 2 is an exemplary block diagram of a logical representation of the network device of FIG. 1 employing the trust verification system.

Referring now to FIG. 2, an exemplary block diagram of a logical representation of the first network device 110 (e.g., endpoint device) is shown. Herein, the first network device 110 comprises one or more hardware processors (referred to as "processor") 200, a memory 210, one or more network interfaces (referred to as "network interface") 220, all of which are connected by one or more interconnects 230. The interconnects 230 may include one or more physical communication paths, such as wired or wireless transmission mediums (e.g., electrical wiring, optical fibers, cables, bus traces, a radio unit that supports radio frequency (RF) signaling) for example, and/or one or more logical communication paths may include an inter-process communication (IPC) mechanism that allows for the exchange of content between different logic. According to one embodiment, the processor 200, memory 210 and network interface 220 may be at least partially encased in a housing 235, which is made entirely or partially of a rigid material (e.g., hardened plastic, metal, glass, composite, or any combination thereof) that protects these components from environmental conditions.

The processor 200 is a multi-purpose, programmable component that accepts digital data as input, processes the input data according to stored instructions, and provides results as output. One example of a processor may include an Intel® x86 central processing unit (CPU) with an instruction set architecture. Alternatively, the processor 200 may include another type of CPU, a digital signal processor (DSP), an Application Specific Integrated Circuit (ASIC), a field-programmable gate array (FPGA), or the like. The applications 240 and operating system (OS) 250 within the memory 210 operate as resources that may perform and/or control operability of the first network device 110.

The memory 210 operates as system memory, provided by non-persistent storage or persistent storage. From a logical perspective, the memory 210 includes a plurality of locations that are addressable by at least the processor 200 for storing logic, including the host application (e.g., cybersecurity agent) 150 that features the trust verification system 130. The memory 210 further includes one or more plug-ins $140_1$-$140_N$ ($N \geq 1$) and a plug-in framework 260 that registers the plug-ins $140_1$-$140_N$ with the operating system 250 and/or controls the loading of packages 160, which may be inclusive of plug-in $140_1$-$140_N$ along with their corresponding catalogs in $170_1$-$170_N$ and catalog representations $180_1$-$180_N$ (e.g., pre-stored catalog hash values). The general operability of the trust verification system 130 is described below in FIGS. 3A-3B.

Figure 3A:
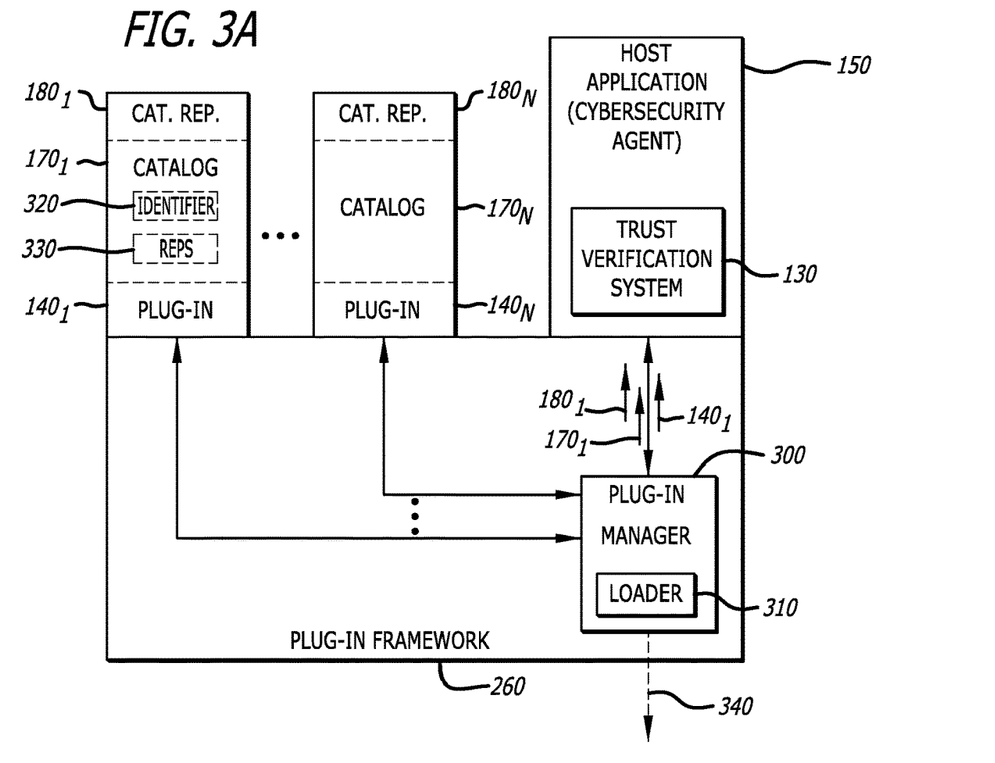
FIG. 3A is an exemplary block diagram of the interoperability of a trust verification system deployed within a host application to verify integrity of one or more plug-ins prior to OS registration.

Referring to FIG. 3A, an exemplary block diagram of the interoperability of the trust verification system 130 deployed within the host application 150 to verify integrity of one or more plug-ins $140_1$-$140_N$ prior to OS registration is shown. Herein, after receipt of a plug-in $140_1$ to alter and/or enhance functionality of the host application (e.g., cybersecurity agent) 150, a plug-in manager 300 of the plug-in framework 260 is configured to verify the integrity of the plug-in $140_1$ prior to registering the plug-in $140_1$ with the operating system. More specifically, the plug-in manager 300 initiate a request to the trust verification system 130 to verify the integrity of the plug-in $140_1$, namely that the content of the plug-in $140_1$ has not been unknowingly modified. Also, the plug-in manager 300 may be configured to information (e.g., meta information, etc.) that identifies the software components that constitute the plug-in $140_1$ without reliance on the catalog $170_1$ in defining the logical components forming the plug-in $140_1$.

The verification of the integrity of the plug-in $140_1$ involves a dual-stage authentication scheme in which a loader 310 of the plug-in manager 300 provides one or more requests, which may include plug-in $140_1$ to the trust verification system 130 along with the catalog $170_1$ and the catalog representation $180_1$ corresponding to the plug-in $140_1$. Herein, according to one embodiment of the disclosure, the catalog $170_1$ includes one or more identifiers 320 of software components forming the plug-in $140_1$ along with representations 330 (e.g., hash values) for these software components associated with identifiers 320. Each identifier 320 may correspond to any data that may be used to identify and distinguish the software component from other software components, such as a series (two or more) alphanumeric characters (e.g., numbers, symbols and/or alphabetical characters, etc.).

The first stage of the authentication scheme involves confirming that the integrity of the catalog $170_1$ has been preserved using the catalog representation $180_1$. If the integrity of the catalog $170_1$ cannot be confirmed, the plug-in $140_1$ cannot be verified, which may result in the plug-in manager 300 precluding registration of the plug-in $140_1$ with the operating system (not shown) of the network device. The plug-in manager 300 may further issue a warning 340 of the failed plug-in verification (e.g., generate a message to an administrator, generate a displayable message on a display associated with the network device, etc.).

However, if the catalog $170_1$ is verified, the trust verification system 130 conducts the second stage of authentication, which involves confirming that the integrity of each of the software components 320 has been preserved using the representations 330. As before, if the integrity of each of the software components 320 cannot be confirmed, then the plug-in $140_1$ cannot be verified. As a result, the plug-in manager 300 may preclude registration of the plug-in $140_1$ with the operating system (not shown) and issue the warning 340 of the failed plug-in verification, as described above. If each of the software components 320 is verified, the plug-in manager 300 may register the plug-in $140_1$ with the operating system (not shown) to allow the plug-in $140_1$ to launch and enhance/alter operability or usability of the cybersecurity agent 150.

Figure 3B:
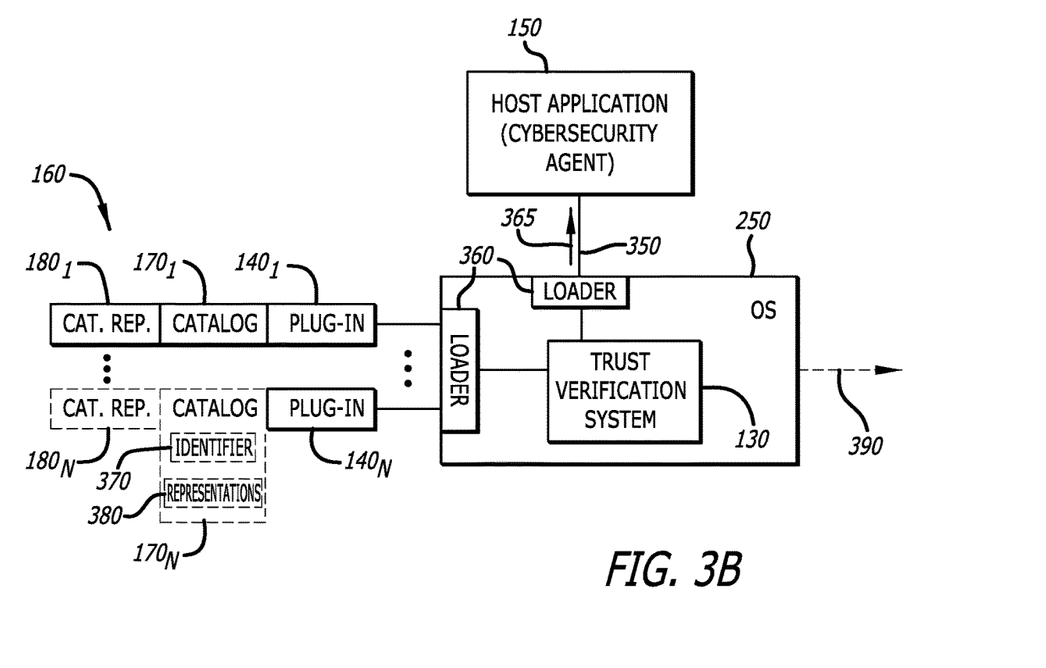
FIG. 3B is an exemplary block diagram of the interoperability of a trust verification system deployed separate from host application to verify integrity of one or more plug-ins prior to OS registration.

Referring now to FIG. 3B, an exemplary block diagram of the interoperability of the trust verification system 130 deployed separate from the host application 150 to verify the integrity of one or more plug-ins $140_1$-$140_N$ prior to registration is shown. Herein, a secure communication interconnect 350 is established between the operating system 250 and the host application 150 (e.g., cybersecurity agent). After receipt of a plug-in $140_N$ to alter and/or enhance functionality of the host application (e.g., cybersecurity agent) 150 for example, a loader 360 is configured to issue a request 365 to the trust verification system 130 to verify the integrity of the plug-in $140_N$ prior to OS registration. The request 365 includes information for the trust verification system 130 to verify the integrity of the plug-in $140_N$, such as the content of the plug-in $140_N$ has not been unknowingly modified.

The verification of the integrity of the plug-in $140_N$ involves the dual-stage authentication scheme as described above, where the loader 360 provides the plug-in $140_N$ to the trust verification system 130 within the OS 250 along with the catalog $170_N$ and the catalog representation $180_N$ (e.g., catalog hash value) corresponding to the plug-in $140_N$. Herein, according to one embodiment of the disclosure, the catalog $170_N$ includes one or more identifiers 370 of software components forming the plug-in $140_N$ along with representations 380 (e.g., hash values) for these software components 370.

For this embodiment, the first stage of the authentication scheme involves confirming that the integrity of the catalog $170_N$ has been preserved, which involves a comparison between the catalog representation $180_N$ and a generated representation (e.g., hash value) of the catalog $170_N$ itself. If the integrity of the catalog $170_N$ cannot be confirmed, the plug-in $140_N$ cannot be verified, which may result in prohibiting registration of the plug-in $140_N$ with the OS 250. The OS 250 may further issue a warning 390 of the failed plug-in verification (e.g., generate a message to an administrator via a network interface, generate a displayable message on a display associated with the network device, etc.).

However, if the plug-in $140_N$ is verified, the trust verification system 130 within the OS 250 conducts the second stage of authentication, which involves confirming that the integrity of one or more of the software components 370 being part of the plug-in $140_N$ using the representations 380. The loader 360 may be configured to select which of the software components 370 to be confirmed based on whether the plug-in $140_N$ is newly added (e.g., all software components) or is an update (e.g., all, only modified software components to reduce processing workload, etc.).

As before, responsive to the integrity of each of the software components 370 cannot be confirmed, the trust verification system 130 returns signaling of the failed plug-in verification to certain logic within the OS 250 or other software logic, which precludes registration of the plug-in $140_N$ with the OS 250 and may cause issuance of the warning 390. If each of the software components 370 is verified, the plug-in $140_N$ is registered with the OS 250 and the plug-in $140_N$ is processed and operates in cooperation with the cybersecurity agent 150.

III. Architecture of the Trust Verification System

Figure 4:
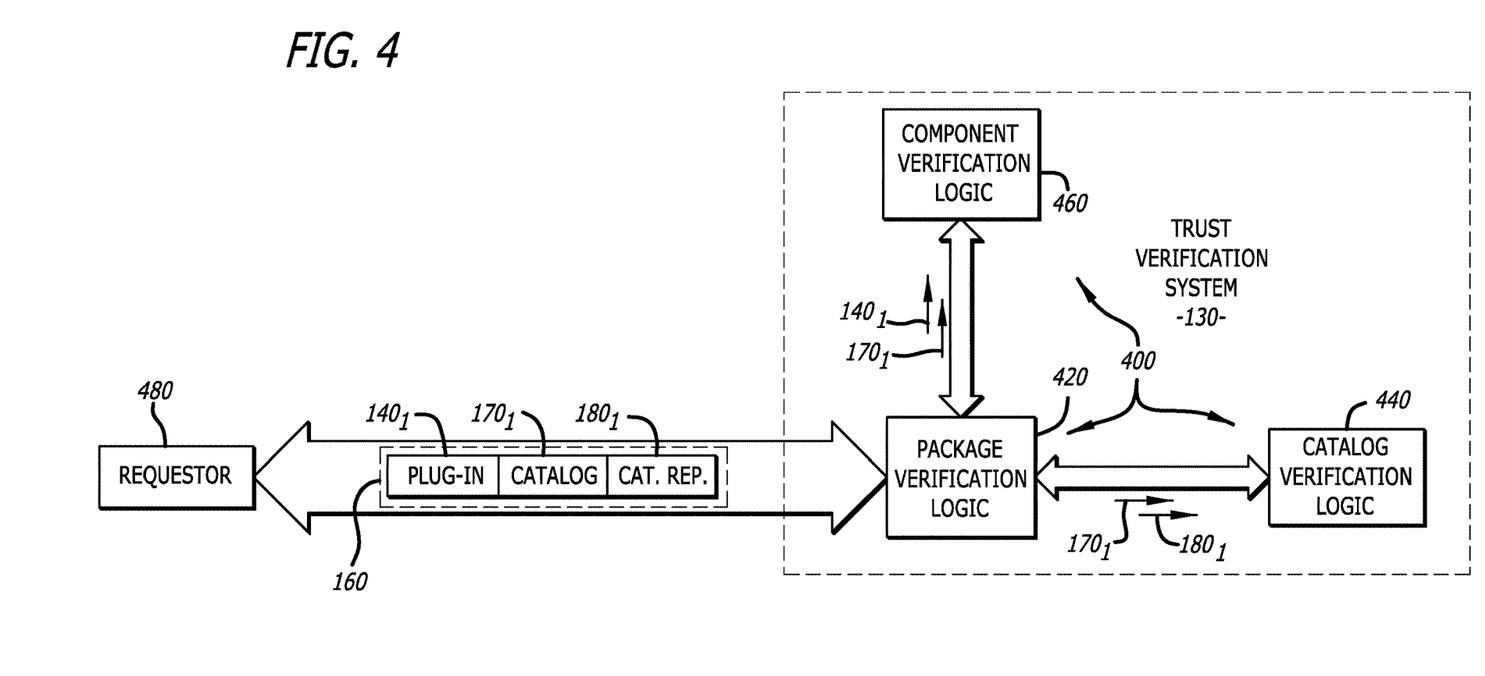
FIG. 4 is an exemplary block diagram of a logical representation of the trust verification system of FIGS. 1-3B.

As shown in FIG. 4, an exemplary block diagram of a logical representation of the trust verification system 130 of FIGS. 1-3B is shown. Herein, the trust verification system 130 includes verification logic 400, namely package verification logic 420, catalog verification logic 440, and component verification logic 460. In particular, in response to receipt of the package 160 from a requestor (source) 480, the package verification logic 420 parses the package 160 to separate elements of the package 160, namely (i) the object $140_1$ whose integrity is requested to be verified (e.g., new or updated plug-in, etc.), (ii) the catalog $170_1$ including identifiers associated with one or more of the software components forming the object $140_1$ and (iii) the representation $180_1$ of the catalog $170_1$ (e.g., a value resulting from conversion of content within the catalog $170_1$ such as a hash value of the catalog $170_1$). Where the object $140_1$ is a new or updated plug-in for example, the catalog $170_1$ includes at least one or more plug-in identifiers and their associated plug-in representations (e.g., plug-in hash values).

During runtime, prior to the plug-in $140_1$ being initialized and launched by the cybersecurity agent, the catalog verification logic 440 analyzes the catalog $170_1$ by conducting a hash operation on the catalog $170_1$ to produce a hash value (hereinafter, "generated catalog hash value"), which is compared to the corresponding hash value of the catalog $170_1$ (hereinafter, "packaged catalog hash value $180_1$"). Based on a comparison between the generated catalog hash value and the packaged catalog hash value $180_1$, the integrity of the catalog $170_1$ has been confirmed. Thereafter, at least the plug-in $140_1$ and the category $170_1$ is provided to the component verification logic 460.

Within the component verification logic 460, the integrity of each plug-in component forming the plug-in $140_1$ is verified. In particular, for each plug-in component, the component verification logic 460 conducts a series of analytics on that plug-in component to confirm its integrity. According to one embodiment, the analytic involves at least conducting a hash operation on the plug-in component to produce a corresponding hash value (hereinafter, "generated component hash value") and authenticating the plug-in component based on a comparison between the generated component hash value and the hash value of the plug-in component included as part of the catalog $170_1$ (hereinafter, "cataloged component hash value"). Based on a successful comparison between the generated component hash value and the cataloged component hash value, the integrity of the plug-in component may be confirmed. This series of analytics is repeated for each plug-in component to confirm the integrity of the entire plug-in (all plug-in components) or for selected plug-in components in the case where specific plug-in components forming the plug-in have been verified.

Figure 5:
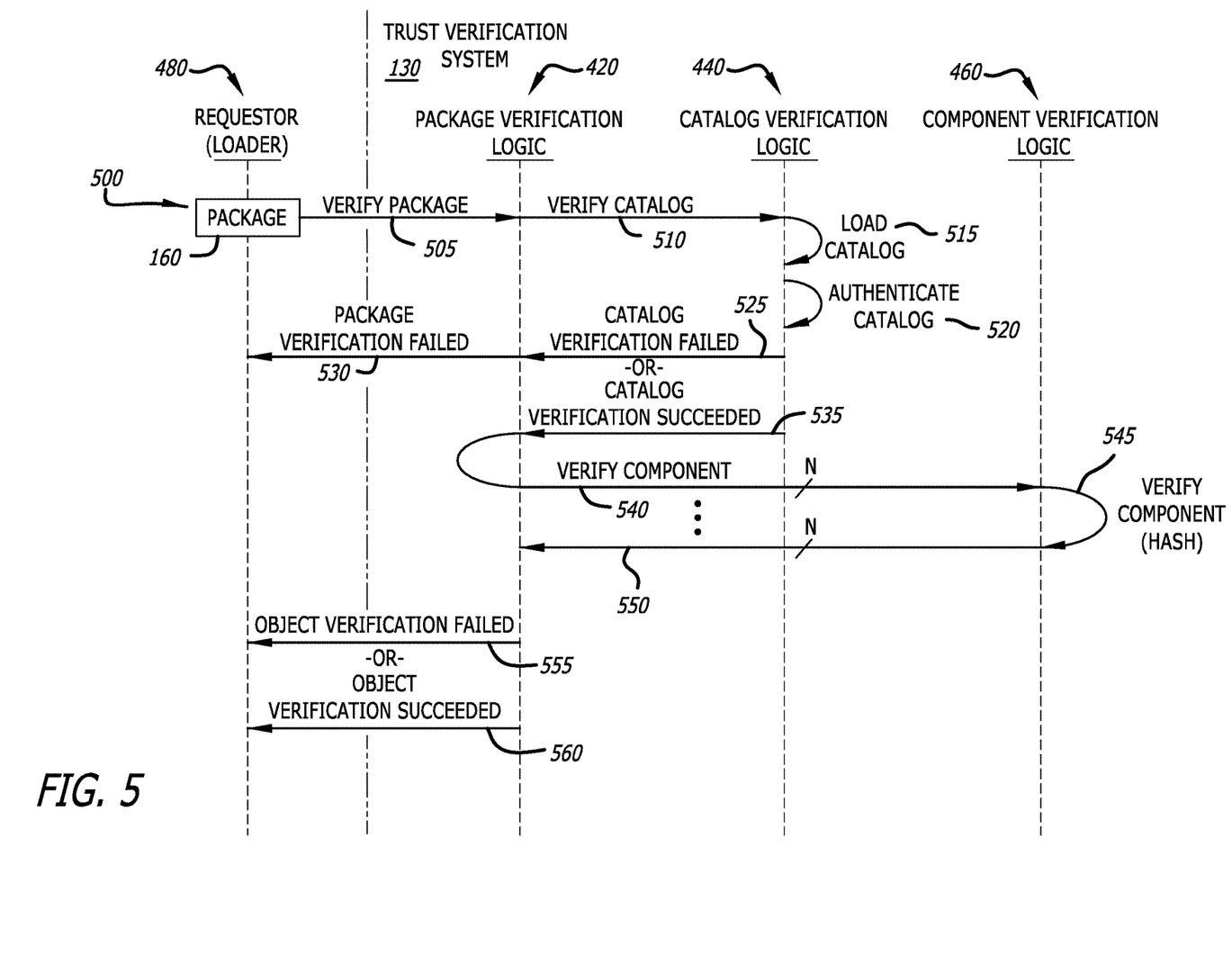
FIG. 5 is a logical representation of an operational flow conducted by the trust verification system of FIG. 4 to verify the integrity of an object encapsulated as part of a package.

Referring now to FIG. 5, a logical representation of an operational flow conducted by the trust verification system 130 of FIG. 4 to verify the integrity of the object $140_1$ encapsulated as part of the package 160 is shown. Herein, the requestor 480 issues a verify package message 500 to the trust verification system 130 to verify the integrity of the package 160 (operation 505). The package verification logic 420 receives the package 160, parses the catalog and its representation from the package 160, and provides the catalog and its representation to the catalog verification logic 440 (operation 510). Thereafter, the catalog verification logic 440 commences a first stage of the object authentication process.

In the first stage of the object authentication process, as shown in operations 515-520, the catalog verification logic 440 verifies the catalog to generate a representation (e.g., hash value) therefrom. Thereafter, the catalog verification logic 440 authenticates the catalog by loading/generating a representation of the catalog (e.g., generated catalog hash value) and conducting a comparison between the generated catalog hash value to the catalog representation included as part of the package (packaged catalog hash value). Upon the catalog verification logic 440 determining a lack of comparison between the generated catalog hash value and the packaged catalog hash value, a catalog verification failed message is provided to the package verification logic (operation 525). Thereafter, the package verification logic notifies the requestor 480 that the verification of the object within the package has failed (operation 530). However, upon the catalog verification logic 440 determining a successful comparison between the generated catalog hash value and the packaged catalog has value, a catalog verification succeeded message is provided to the package verification logic 420 (operation 535).

In response to receipt of the catalog verification succeeded message, the package verification logic 420 commences the second stage of the authentication process. In particular the second stage of the authentication process involves a series of analytics to confirm that the integrity of each of the software components collectively forming the object $140_1$ has been preserved. One technique for confirming the integrity of the software components include generating a hash value associated with one or more software components at least partially forming the plug-in and comparing each of the generated component hash values with packaged component hash values maintained within the catalog (operation 545). If the integrity of each of the software components cannot be confirmed by the component verification logic 460, then the object cannot be verified. As a result, the package verification logic 420 sends an object verification failed message to the requestor 480 to identify that the integrity of the object is suspect (operations 550 and 555). However, if the integrity of each of the software components has been confirmed by the component verification logic 460, the package verification logic 420 sends an object verification succeeded message to the requestor 480 to identify that the integrity of the object has been preserved (operations 550 and 560). As a result, the object may be installed and/or launched.

Figure 6:
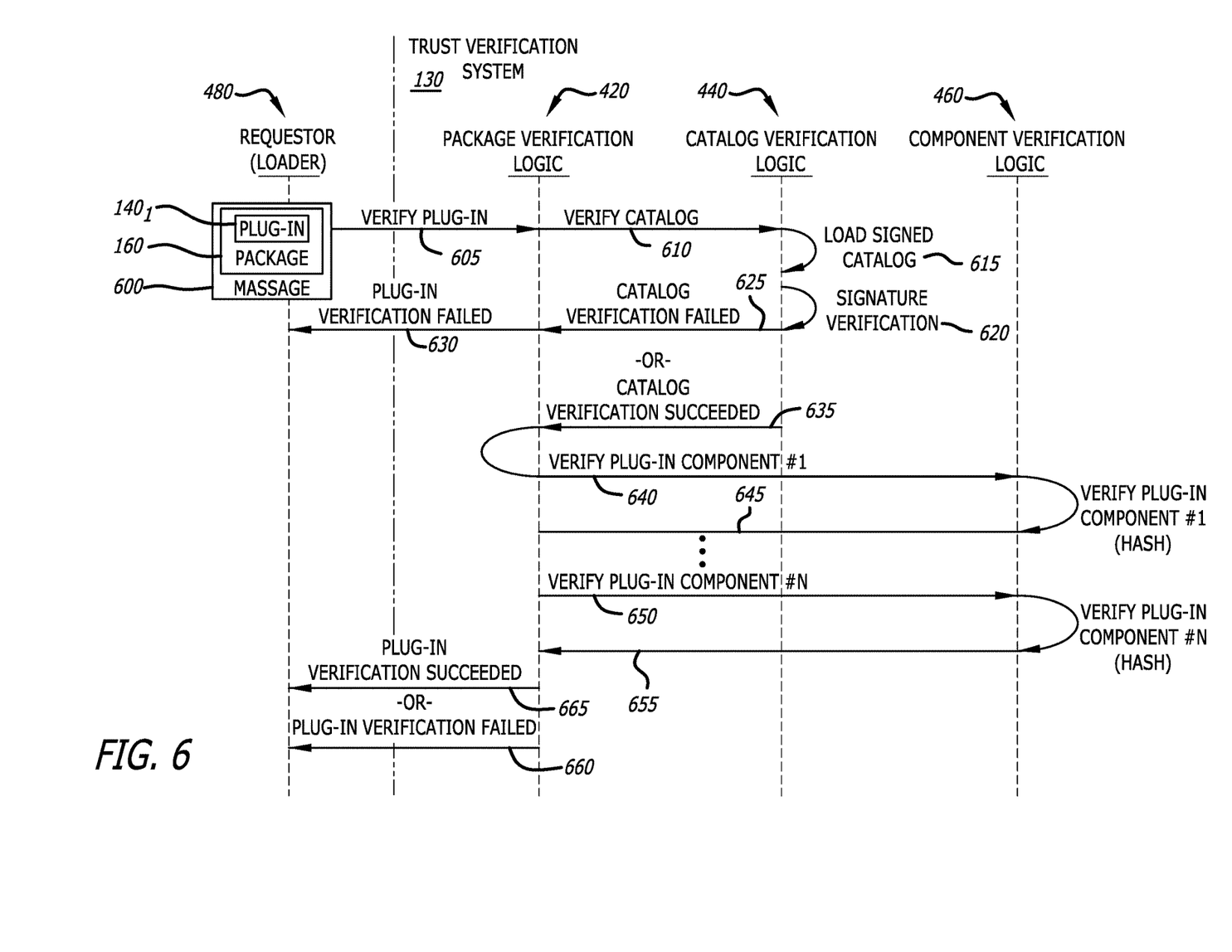
FIG. 6 is a more detailed logical representation of an operational flow conducted by the trust verification system of FIG. 4 to verify the integrity of a plug-in encapsulated as part of the package.

Referring to FIG. 6, a more detailed logical representation of an operational flow conducted by the trust verification system 130 of FIG. 4 to verify the integrity of the plug-in $140_1$ encapsulated as part of the package 160. Herein, the requestor 480 issues a verify plug-in message 600 to the trust verification system 130 to verify the integrity of the plug-in $140_1$ (operation 605). The package verification logic 420 receives the package 160, parses the catalog and its representation from the package 160, and provides the catalog and its representation to the catalog verification logic 440 (operation 610). Thereafter, the catalog verification logic 440 commences a first stage of the plug-in authentication process.

In the first stage of the plug-in authentication process, as shown in operations 615-620, the catalog verification logic 440 verifies the catalog to generate a representation (e.g., hash value) therefrom. Thereafter, the catalog verification logic 440 authenticates the signed catalog through signature verification scheme by recovery of the packaged catalog hash value from the signed catalog and comparing the generated catalog hash value to the packaged catalog hash value. Upon the catalog verification logic 440 determining a lack of comparison between the generated catalog hash value and the packaged catalog hash value, a catalog verification failed message is provided to the package verification logic (operation 625). Thereafter, the package verification logic 420 notifies the requestor 480 that the verification of the plug-in within the package has failed (operation 630). However, upon the catalog verification logic 440 determining a successful comparison between the generated catalog hash value and the packaged catalog has value, a catalog verification succeeded message is provided to the package verification logic 420 (operation 635).

In response to receipt of the catalog verification succeeded message, the package verification logic 420 commences the second stage of the authentication process. In particular the second stage of the authentication process involves a series of analytics to confirm that the integrity of each of the software components collectively forming the plug-in has been preserved. One technique for confirming the integrity of the software components include generating a hash value associated with one or more (R≥1) software components at least partially forming the plug-in and comparing each of the generated component hash values with the packaged component hash values maintained within the catalog (operations 640, 650). This comparison may be conducted in parallel or in serial. If the integrity of each of the software components cannot be confirmed by the component verification logic 460, then the plug-in cannot be verified. As a result, the package verification logic 420 sends a plug-in verification failed message to the requestor 480 to identify that the integrity of the plug-in is suspect (operations 645, 655, 660). However, if the integrity of each of the software components has been confirmed by the component verification logic 460, the package verification logic 420 sends a plug-in verification succeeded message to the requestor 480 to identify that the integrity of the plug-in has been preserved (operations 645, 655, 665). As a result, the plug-in may be installed and/or launched.

Herein, in the foregoing description, the invention is described with reference to specific exemplary embodiments thereof. It will, however, be evident that various modifications and changes may be made thereto without departing from the broader spirit and scope of the invention as set forth in the appended claims. For instance, as an alternative embodiment, where verification is to be conducted on an updated object, it is contemplated that the verification may be conducted by determining a difference between the prior object and the updated object (e.g., different content between different versions of a plug-in or a script) and the catalog may include content for use in verifying the differences in content between the prior object and the updated object.

What is claimed is:

1. A trust verification system to automatically verify an integrity of an object across multiple operating system (OS) platforms, comprising:
  one or more processors; and
  a non-transitory storage medium communicatively coupled to the one or more processors, the non-transitory storage medium comprises logic to perform three verification operations to verify the integrity of the object, including
    (i) package verification logic configured to parse content of an incoming package to recover the object, the incoming package being a collection of information including (a) one or more software components forming the object or an identifier associated with each software component of the one or more of software components, (b) a catalog including an identifier for each of the one or more software components forming the object along with a corresponding representation associated with each of the one or more software components, and (c) a representation of the catalog,
    (ii) catalog verification logic configured to verify an integrity of the catalog by at least conducting a conversion of the content of the catalog and comparing the converted content of the catalog to the representation of the catalog, and
    (iii) component verification logic configured to verify an integrity of the one or more software components associated with the object by at least converting each of the one or more software components into corresponding representations and comparing each of the corresponding representations to representations associated with the one or more software components,
  wherein the package verification logic is configured to verify the integrity of the object associated with the incoming package in response to the catalog verification logic verifying the integrity of the catalog, and thereafter, the component verification logic verifying the integrity of the one or more software components.

2. The trust verification system of claim 1, wherein the package verification logic is communicatively coupled to the catalog verification logic and provides the catalog and the representation of the catalog to the catalog verification logic.

3. The trust verification system of claim 2, wherein the catalog verification logic verifies the integrity of the catalog when the converted content of the catalog matches the representation of the catalog.

4. The trust verification system of claim 2, wherein the catalog verification logic verifies the integrity of the catalog by conducting a hash operation of the content of the catalog to generate a hash value corresponding to the converted content and successfully comparing the generated hash value to the representation being a pre-stored hash value of the catalog corresponding to the representation of the catalog.

5. The trust verification system of claim 4, wherein the catalog verification logic successfully compares the generated hash value to the pre-stored hash value by determining that the generated hash value matches the pre-stored hash value.

6. The trust verification system of claim 5, wherein the component verification logic is configured to verify the integrity of the one or more software components associated with the object by at least determining whether the corresponding representations match the representations associated with the one or more software components stored in the catalog.

7. The trust verification system of claim 1, wherein the object is a plug-in software to alter functionality of a host application.

8. The trust verification system of claim 7, wherein the host application is a cybersecurity agent installed on a network device and configured to conduct certain security-based tasks.

9. The trust verification system of claim 7, wherein the plug-in software comprises a plurality of plug-in software components.

10. The trust verification system of claim 9, wherein the component verification logic is configured to verify the integrity of one or more plug-in software components of the plurality of plug-in software components by at least determining whether the corresponding representations match the representations associated with the one or more plug-in software components, wherein the one or more software plug-in components corresponds to the one or more software components and is lesser in number than a total number of the plurality of plug-in software components forming the plug-in software.

11. The trust verification system of claim 1, wherein the one or more software components is a portion of code of the object being an executable.

12. A computerized method for automatically verifying an integrity of an object across multiple operating system (OS) platforms through a three-stage verification process, comprising:

generating a package including an object, a catalog associated with the object, and a representation of the catalog, wherein the catalog including identifiers associated with one or more software components forming the object and representations associated with each of the one or more software components;

transmitting the package to a network device including a trusted verification system that includes (i) catalog verification logic configured to verify an integrity of the catalog by at least conducting a conversion of the content of the catalog and comparing the converted content of the catalog to the representation of the catalog, (ii) a component verification logic configured to verify an integrity of the one or more software components associated with the object by at least converting each of the one or more software components into corresponding representations and comparing each of the corresponding representations to representations associated with the one or more software components in response to the catalog verification logic verifying the integrity of the catalog, and (iii) package verification logic is configured to verify an integrity of the object independent of a type of operating system supported by the network device.

13. The computerized method of claim 12, wherein the object is either a plug-in software to alter functionality of a host application or a script.

14. The computerized method of claim 13, wherein the host application is a cybersecurity agent installed on a network device and configured to conduct certain security-based tasks.

15. The computerized method of claim 13, wherein the one or more software components associated with the plug-in software corresponds to one or more plug-in software components and is lesser in number than a total number of plug-in software components forming the plug-in software.

16. The computerized method of claim 12, where an order of operation for verifying the integrity of the object includes (1) verifying the integrity of the catalog, followed by (2) verifying the integrity of the one or more software components.

17. A non-transitory computer readable medium including a trust verification system that, when executed by one or more processors, automatically verifies an integrity of an object across multiple operating system (OS) platforms, the non-transitory computer readable medium comprising:

package verification logic to parse content of a received incoming package to recover (i) the object, (ii) a catalog including information that identifies one or more of software components forming the object and representations associated with each of the one or more software components, and (iii) a representation of the catalog;

catalog verification logic to verify an integrity of the catalog by at least conducting a conversion of the content of the catalog and comparing the converted content of the catalog to the representation of the catalog; and component verification logic to verify an integrity of the one or more software components associated with the object by at least converting each of the one or more software components into corresponding representations and comparing each of the corresponding representations to representations associated with the one or more software components, wherein the package verification logic is configured to verify an integrity of the object associated with the incoming package in response to the catalog verification logic verifying the integrity of the catalog, and thereafter, the component verification logic verifying the integrity of the one or more software components.

18. The non-transitory computer readable medium of claim 17, wherein the catalog verification logic of the trust verification system verifies the integrity of the catalog by conducting a hash operation of the converted content of the catalog to generate a hash value and successfully comparing the generated hash value to the representation being a pre-stored hash value of the catalog.

19. The non-transitory computer readable medium of claim 17, wherein the component verification logic of the trust verification system is configured to verify the integrity of the one or more software components associated with the object by at least determining whether the corresponding representations match the representations associated with the one or more software components stored in the catalog.

20. The non-transitory computer readable medium of claim 17, wherein the object is a plug-in software to alter functionality of a host application.

21. The non-transitory computer readable medium of claim 17, wherein the integrity of the object is compromised when the integrity of the catalog cannot be verified or the integrity of the one or more software components cannot be verified.

* * * * *